(12) United States Patent
Hostetter et al.

(10) Patent No.: US 10,926,299 B2
(45) Date of Patent: Feb. 23, 2021

(54) TOOL AND METHOD FOR CLEANING A VALVE BODY OF A CONTROL VALVE

(71) Applicant: FISHER CONTROLS INTERNATIONAL LLC, Marshalltown, IA (US)

(72) Inventors: Steven K. Hostetter, Colfax, IA (US); Wesley T. Ohrt, Ankeny, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 417 days.

(21) Appl. No.: 15/721,204

(22) Filed: Sep. 29, 2017

(65) Prior Publication Data

US 2019/0099785 A1   Apr. 4, 2019

(51) Int. Cl.
*B08B 1/00* (2006.01)
*B08B 9/00* (2006.01)
(Continued)

(52) U.S. Cl.
CPC .............. *B08B 1/001* (2013.01); *B08B 1/005* (2013.01); *B08B 1/04* (2013.01); *B08B 9/00* (2013.01);
(Continued)

(58) Field of Classification Search
CPC ......... B08B 1/001; B08B 1/002; B08B 1/003; B08B 1/005; B08B 1/006; B08B 1/00; B08B 1/04; B08B 9/00; B08B 9/02; B08B 9/021; B08B 9/027; B08B 9/043; B08B 9/045; B08B 9/0436; B08B 9/0433;
(Continued)

(56) References Cited

U.S. PATENT DOCUMENTS 1,420,714 A * 6/1922 Lee ........................... A46B 5/00
                                                                15/212
2,037,870 A * 4/1936 Whisler ..................... B08B 9/36
                                                                15/65
(Continued)

FOREIGN PATENT DOCUMENTS

EP      1486706 A1   12/2004
FR         5654 E     6/1906
(Continued)

OTHER PUBLICATIONS

International Search Report for Application No. PCT/US2018/050697 dated Sep. 12, 2018.
(Continued)

*Primary Examiner* — Robert J Scruggs
(74) *Attorney, Agent, or Firm* — Marshall, Gerstein & Borun LLP

(57) ABSTRACT

A tool and a method are provided for cleaning a sealing surface of a valve body. The tool includes a stem adapted to be disposed in the valve body, at least one cleaning element coupled to the stem, and a handle operatively coupled to the at least one cleaning element via the stem. The at least one cleaning element includes at least one cleaning surface adapted to engage the sealing surface when the stem is disposed in the valve body. The at least one cleaning element is movable responsive to actuation of the handle such that the at least one cleaning surface cleans the sealing surface of the valve body.

12 Claims, 3 Drawing Sheets

(51) Int. Cl.
 B08B 9/02 (2006.01)
 B08B 1/04 (2006.01)
 F16K 1/44 (2006.01)
 F16K 27/02 (2006.01)
(52) U.S. Cl.
 CPC ............... B08B 9/021 (2013.01); *F16K 1/44* (2013.01); *F16K 27/02* (2013.01)
(58) Field of Classification Search
 CPC ... F16K 1/44; F16K 27/02; F28G 3/10; F41A 29/02
 See application file for complete search history.

(56) References Cited

U.S. PATENT DOCUMENTS

| | | | | |
|---|---|---|---|---|
| 3,133,298 | A * | 5/1964 | Norwood | A46B 3/08 |
| | | | | 15/164 |
| 3,336,617 | A * | 8/1967 | Bosko | B44D 3/12 |
| | | | | 15/146 |
| 4,512,810 | A * | 4/1985 | Gahlinger | B08B 9/021 |
| | | | | 134/42 |
| 5,709,003 | A | 1/1998 | Batch | |
| 2011/0277262 | A1* | 11/2011 | Smetana | B08B 9/087 |
| | | | | 15/236.01 |

FOREIGN PATENT DOCUMENTS

| | | |
|---|---|---|
| FR | 2977516 A1 | 1/2013 |
| GB | 2483777 A | 3/2012 |
| WO | WO-2013039779 A1 | 3/2013 |
| WO | WO-2017214622 A1 | 12/2017 |

OTHER PUBLICATIONS

Written Opinion for Application No. PCT/US2018/050697, dated Sep. 12, 2018.

* cited by examiner

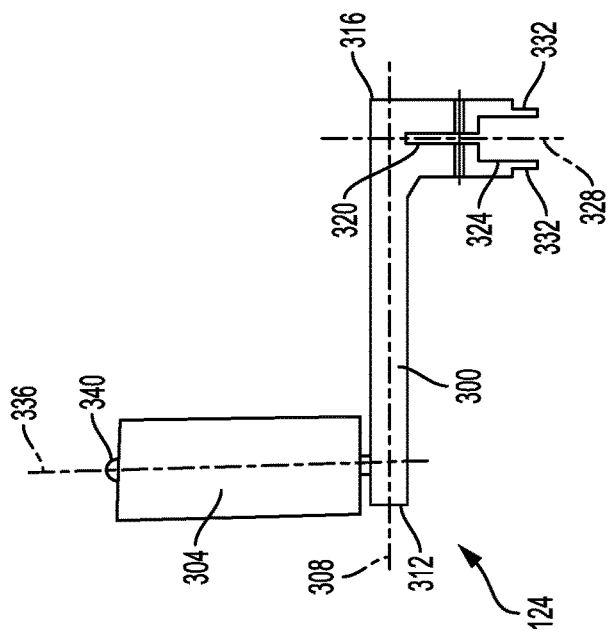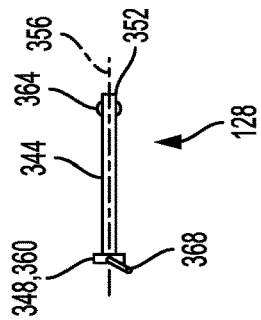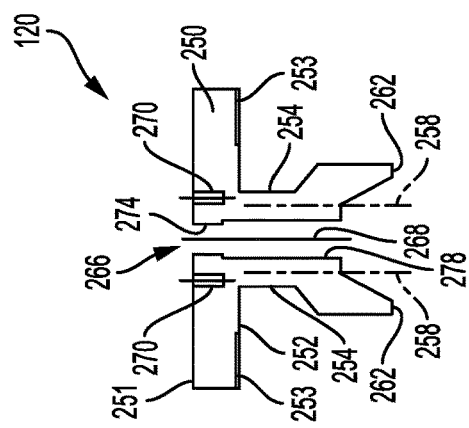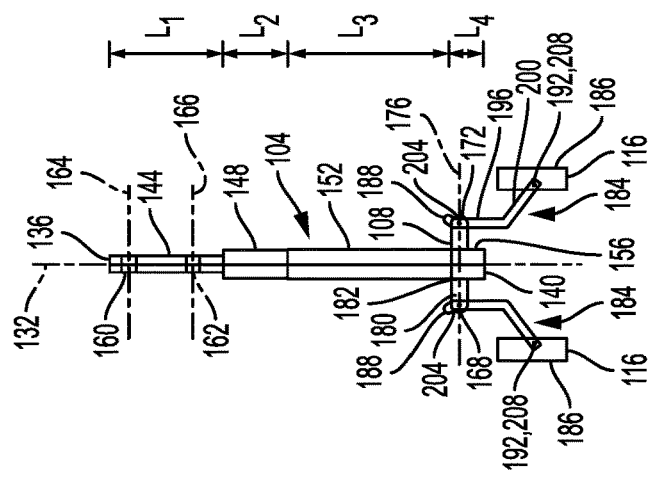

TOOL AND METHOD FOR CLEANING A VALVE BODY OF A CONTROL VALVE

FIELD OF THE DISCLOSURE

The present disclosure generally relates to control valves and, more particularly, to a tool and method for cleaning a valve body of a control valve.

BACKGROUND

Process control systems typically include various components for controlling various process parameters. For example, a fluid process control system may include a plurality of control valves for controlling flow rate, temperature, and/or pressure of a fluid flowing through the system. The end product is dependent on the accuracy of the control of these parameters, which is, in turn, dependent on the geometry and characteristics of the control valves. Control valves are, for example, specifically designed and selected to provide for particular flow capacities and pressure changes. When these characteristics are compromised, the quality of the end product may be affected.

A control valve typically includes components such as a valve body, a valve trim assembly (e.g., a flow control member, a valve stem, a valve seat) disposed in the valve body, and various sealing elements (e.g., gaskets, seals) arranged between components of the valve trim assembly and sealing surfaces in the valve body to prevent fluid leakage therebetween. During operation of the control valve, it is often necessary to repair or replace components of the valve trim assembly and/or replace one or more of the sealing elements. At that time, the valve trim assembly and the sealing elements are removed from the valve body and repaired or changed as needed.

To ensure that the quality of the end product is not affected, and to ensure that any sealing elements installed in the valve body function properly, the various sealing surfaces of the valve body are typically cleaned when the valve trim assembly and the sealing elements are removed from the valve body for repair or replacement. Conventionally, this is accomplished by having an operator of the control valve manually scrub each of the sealing surfaces, individually. In many cases, this cleaning process does not effectively and consistently clean the sealing surfaces of the valve body, which can be difficult to access and view. But even when the cleaning process is effective, the process exposes the operator to potentially dangerous chemicals, materials, or sharp features that may be present in the valve body. Additionally, the process can be time consuming.

SUMMARY

In accordance with a first exemplary aspect of the present disclosure, a tool is provided for cleaning a sealing surface of a valve body. The tool includes a stem adapted to be disposed in the valve body, at least one cleaning element coupled to the stem, and a handle operatively coupled to the at least one cleaning element via the stem. The at least one cleaning element includes at least one cleaning surface adapted to engage the sealing surface when the stem is disposed in the valve body. The at least one cleaning element is movable responsive to actuation of the handle such that the at least one cleaning surface cleans the sealing surface of the valve body.

In accordance with a second exemplary aspect of the present disclosure, a tool is provided for cleaning first and second sealing surfaces of a valve body. The tool includes a stem adapted to be disposed in the valve body, at least one first cleaning element coupled to a first portion of the stem, at least one second cleaning element coupled to a second portion of the stem, and a handle operatively coupled to the at least one first cleaning element and the at least one second cleaning element via the stem. The at least one first cleaning element includes at least one first cleaning surface adapted to engage the first sealing surface when the stem is disposed in the valve body. The at least one second cleaning element includes at least one second cleaning surface adapted to engage the second sealing surface when the stem is disposed in the valve body. The at least one first cleaning element and the at least one second cleaning element are movable responsive to actuation of the handle such that the at least one first and at least one second cleaning elements clean the first and second sealing surfaces of the valve body.

In accordance with a third exemplary aspect of the present disclosure, a method of cleaning first and second sealing surfaces of a valve body is provided. The method includes: providing a body comprising a stem and at least one first cleaning element coupled to the stem and carrying at least one first cleaning surface; providing at least one second cleaning element carrying at least one second cleaning surface; coupling the at least one second cleaning element to the stem such that the at least one first cleaning element is in a retracted position; disposing the stem, the at least one first cleaning element, and the at least one second cleaning element in the valve body such that (i) the at least one first cleaning surface is proximate but spaced from the first sealing surface, and (ii) the at least one second cleaning surface engages the second sealing surface of the valve body; moving the at least one first cleaning element from the retracted position to an expanded position in which the at least one first cleaning surface engages the first sealing surface of the valve body; and manipulating the at least one first cleaning surface and the at least one second cleaning surface to clean the first and second sealing surfaces of the valve body.

In further accordance with the foregoing first, second, and/or third aspects, a tool and/or method may further include any one or more of the following preferred forms.

In accordance with one preferred form, a lever is coupled to the handle and to the shaft. The lever may include an opening and the stem may have an end removably disposed in the opening of the lever. The stem may include first and second apertures corresponding to first and second positions of the stem relative to the handle, respectively, and a locking element may be provided that is configured to be removably disposed in the first or second aperture to secure the stem in the first or second position, respectively.

In accordance with another preferred form, at least one leg is coupled to and extends outward from the stem, the at least one cleaning element coupled to the stem via the at least one leg. A collar may be coupled to the stem and may carry the at least one leg. The at least one first leg may be rotatable relative to the collar to move the at least one first cleaning element between a retracted position, spaced from the first sealing surface of the valve body, and an expanded position, in engagement with the first sealing surface of the valve body.

In accordance with another preferred form, a lever is coupled to the handle and to the stem, the at least one cleaning element includes a sleeve having at least one slot, and the lever includes at least one outwardly extending projection arranged to be removably disposed in the at least one slot.

In accordance with another preferred form, a lever is coupled to the handle and to the shaft, the lever includes an opening, and the stem has an end removably disposed in the opening of the lever.

In accordance with another preferred form, the stem includes first and second apertures corresponding to first and second positions of the stem relative to the handle, respectively, and a locking element is configured to be removably disposed in the first or second aperture to secure the stem in the first or second position, respectively.

In accordance with another preferred form, the at least one second cleaning element includes a sleeve having a base portion at least one second leg extending outward from the base portion, the base portion carrying the at least one second cleaning surface.

In accordance with another preferred form, a lever is coupled to the handle and the stem, the at least one second cleaning element includes at least one slot formed in the base portion of the sleeve, and the lever includes at least one outwardly extending projection arranged to be removably disposed in the at least one slot.

In accordance with another preferred form,

In accordance with another preferred form, a control mechanism is provided and includes a lever and a handle coupled to the lever. The lever may be coupled to the stem. Moving the at least one first cleaning element from the retracted position to the expanded position may include rotating the handle relative to the at least one second cleaning element.

In accordance with another preferred form, at least one projection of the lever is moved into at least one slot formed in the at least one second cleaning element.

In accordance with another preferred form, the at least one first and the at least one second cleaning surface are manipulated by rotating the handle In accordance with another preferred form, prior to the manipulating step, a locking element is inserted into an aperture formed in the stem prior to manipulating the at least one first and the at least one second cleaning surface.

In accordance with another preferred form, the at least one second cleaning element is coupled to the stem such that the at least one first cleaning element is in a retracted position by loosely threading the at least one second cleaning element to the stem. The at least one first cleaning element may be moved from the retracted position to the expanded position by tightly threading the at least one second cleaning element to the stem.

BRIEF DESCRIPTION OF THE DRAWINGS

FIG. 2 is a cross-sectional view of a stem, a collar, and first cleaning elements of the tool of FIG. 1;

FIG. 3 is a cross-sectional view of a second cleaning element of the tool of FIG. 1;

FIG. 4 is a cross-sectional view of a control mechanism of the tool of FIG. 1;

FIG. 5 is a cross-sectional view of a locking element of the tool of FIG. 1;

DETAILED DESCRIPTION

Figure 1:
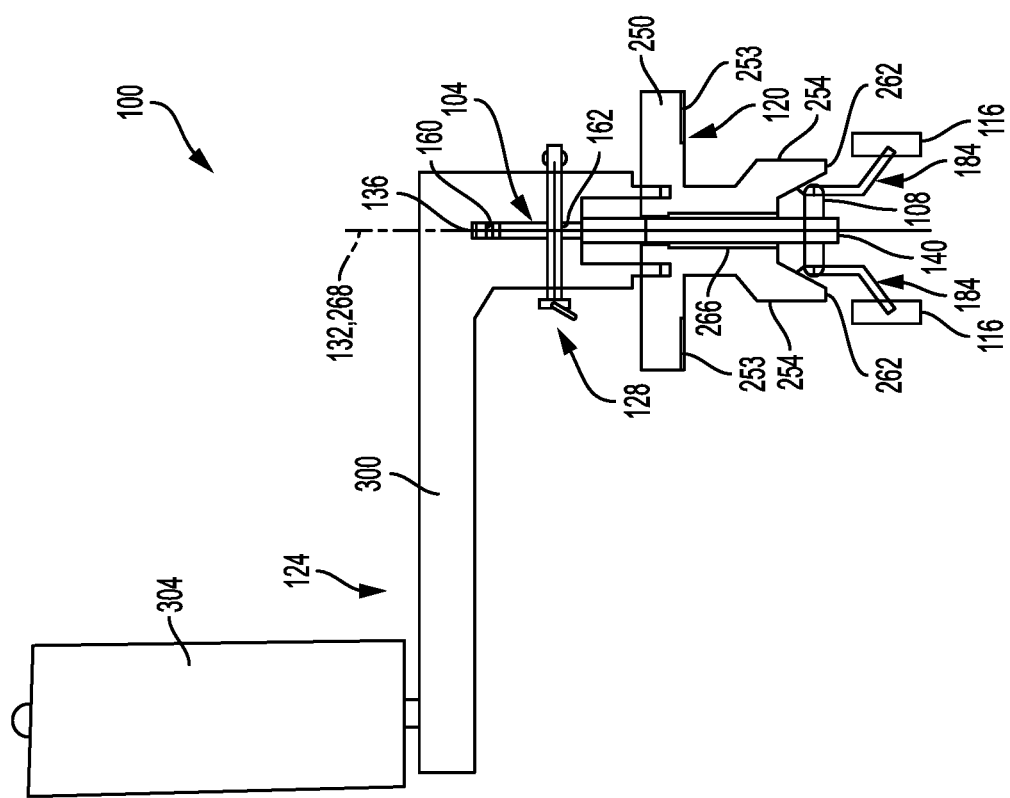
FIG. 1 is a cross-sectional view of a tool constructed in accordance with the teachings of the present disclosure.

The present disclosure is directed to a tool and a method for cleaning a valve body of a control valve after a valve trim assembly and/or sealing elements of the control valve have been removed for repair or replacement. The disclosed tool and method allow an operator of the control valve to effectively clean the valve body without having to reach inside of the valve body and manually and individually scrub the sealing surfaces of the valve body by hand, such that the operator is not exposed to potentially dangerous chemicals, materials, or sharp features that may be present in the valve body. Additionally, the disclosed tool and method facilitate a more consistent and less time consuming process of cleaning the valve body.

FIGS. 1-5 illustrate one example of a tool 100 constructed in accordance with the principles of the present disclosure. As such, the tool 100 is generally configured for use in easily, safely, effectively, and consistently cleaning a valve body of a control valve (e.g., a sliding-stem type control valve, a rotary control valve, or another type of control valve) after a valve trim assembly (including, e.g., a valve seat, a valve stem, and a flow control member) of the control valve and any sealing elements (e.g., gaskets, seals) employed in the control valve have been removed from the valve body for replacement or repair. It will also be appreciated that it is conceivable that the tool 100 can instead or also be used to clean the valve body of the control valve before the control valve has been placed into operation and before the valve trim assembly has been disposed therein.

As illustrated, the tool 100 in this example generally includes a stem 104, a collar 108 coupled to the stem 104, a pair of first cleaning elements 116 carried by the collar 108, a second cleaning element 120 coupled to the stem 104, a control mechanism 124 that is coupled to the stem 104 for controlling the position of the first and second cleaning elements 116, 120, and a locking element 128 for releasably locking the tool 100 in various positions. In other examples, the tool 100 can include more, less, or different components. As an example, the tool 100 may only include one first cleaning element 116 and/or multiple second cleaning elements 120. As another example, the tool 100 may not include the locking element 128.

The stem 104 is generally adapted to be disposed in a valve body of a control valve. As illustrated in FIGS. 1 and 2, the stem 104 generally extends along a longitudinal axis 132 from a first end 136 to a second end 140. The stem 104 in this example has four portions—a first portion 144, a second portion 148, a third portion 152, and a fourth portion 156—each having a rectangular shape in cross-section. The first portion 144 defines the first end 136 and has an outer surface that, at least in this example, is not threaded. The second portion 148 has an outer surface that is threaded, at least in this example, and has an outer diameter that is larger than an outer diameter of the outer surface of the first portion 144. The third portion 152 has an outer surface that is not threaded, at least in this example, and has an outer diameter that is slightly larger than or equal to the outer diameter of the outer surface of the second portion 148. The fourth portion 156 defines the second end 140 and has an outer surface that is threaded, at least in this example. In other examples, the stem 104 can be shaped, sized, or oriented differently, include more or less portions, the second and fourth portions 148, 156 may not be threaded, and/or the first and third portions 144, 152 may be threaded.

As best illustrated in FIG. 2, the first portion 144 has a first length $L_1$, the second portion 148 has a second length $L_2$ that is less than the first length $L_1$, the third portion 152 has a third length $L_3$ that is greater than the first length $L_1$ and the second length $L_2$, and the fourth portion 156 has a fourth length $L_4$ that is less than each of the first, second, and third lengths $L_1$, $L_2$, and $L_3$. In other examples, however, the first, second, third, and fourth lengths $L_1$, $L_2$, $L_3$, and $L_4$ may vary. Moreover, in other examples, the total length of the stem 104 ($L_1+L_2+L_3+L_4$) may be adjustable in order to accommodate different sized control valves. In one such example, the length $L_1$ of the first portion 144 may be increased or decreased by rotating the first portion 144 relative to the second portion 148.

As also best illustrated in FIG. 2, the stem 104 also includes first and second apertures 160, 162 that extend through different portions of the first portion 144 along transverse axes 164, 166, respectively, that are perpendicular to the longitudinal axis 132 (and parallel to one another). The first aperture 160 is positioned proximate to, but spaced from, the first end 136, while the second aperture 162 is positioned closer to the second end 140 and is positioned proximate to but spaced from the second portion 148. As will be described in greater detail below, the first and second apertures 160, 162 are sized to receive the locking element 128 to lock the stem 104, and more generally the tool 100, in a respective desired position.

With reference still to FIGS. 1 and 2, the collar 108 is removably coupled to and extends outward from a portion of the stem 104, such that the collar 108 extends from a first end 168 to a second end 172 along a transverse axis 176 that is perpendicular to the longitudinal axis 132. The collar 108 in this example has a body 180 having an inner surface that defines a bore 182 that is sized to receive a portion of the stem 104. In this example, the body 180 has a rectangular shape in cross-section and the inner surface of the body 180 is threaded, such that the collar 108 can be coupled to the stem 104 by threadingly engaging the inner surface of the collar 108 to the (threaded) outer surface of the fourth portion 156 of the stem 104. In other examples, however, the collar 108 may have a different size and/or shape, may be threaded to a different portion of the stem 104, or may be coupled to the stem 104 in a different manner (e.g., the collar 108 may be fixed to the stem 104).

As illustrated in FIGS. 1 and 2, the first cleaning elements 116 in this example take the form of a pair of rectangularly-shaped cleaning pads carried by the collar 108 via a pair of first legs 184, respectively. Each of the cleaning pads has an outer surface 186 that includes, and is preferably coated with, a cleaning substance, e.g., emery, which facilitates cleaning of a sealing surface of the valve body. Thus, the outer surface 186 of each of the first cleaning elements 116 may be referred to herein as a cleaning surface of the respective first cleaning element 116. In some cases, the cleaning surfaces 186 may be removably coupled to the cleaning pads, respectively, such that the cleaning surfaces 186 can be removed and replaced with second cleaning surfaces 186 that are new (when the original cleaning surfaces 186 are worn out), include one or more different cleaning substances (to effectively clean control valves made of different materials), and/or are larger or smaller than the original cleaning surfaces 186 (so as to effectively clean differently sized control valves). Each of the first legs 184 has a first end 188, a second end 192 opposite the first end 188, and first and second intermediate portions 196, 200 extending therebetween. The first end 188 of each first leg 184 is rotatably coupled to the collar 108 via a pin 204, and the second end 192 of each first leg 184 is fixedly coupled to a respective one of the cleaning elements 116 via a pin 208. The intermediate portions 196, 200, meanwhile, are angled relative to one another.

So arranged, the first cleaning elements 116 are rotatable relative to the collar 108, about the pins 204, respectively, in an arc-like manner. Thus, the first cleaning elements 116 can be moved toward or away from the longitudinal axis 132 between an expanded position (shown in FIG. 1) and a retracted position (shown in FIG. 6), which, at least in this example, is the default position of the first cleaning elements 116. When the first cleaning elements 116 are in the expanded position, the first intermediate portion 196 extends along an axis that is coaxial with the longitudinal axis 132, and the second intermediate portion 200 extends along an axis that is oriented at an angle of between approximately 0 degrees and approximately 90 degrees relative to the longitudinal axis 132, such that the first cleaning elements 116 are arranged radially outward of the profile of the collar 108 and extend along an axis that is parallel to the longitudinal axis 132. When, however, the first cleaning elements 116 are in the retracted position, the first and second intermediate portions 196, 200 each extend along an axis that is oriented at an angle relative to the longitudinal axis 132, such that the first cleaning elements 116 extend along an axis that is oriented at an angle of between approximately 0 degrees and approximately 90 degrees relative to the longitudinal axis 132 and at least a portion of each of the first cleaning elements 116 is arranged between the first and second ends 168, 172 of the collar 108 (i.e., within the profile of the collar 108).

In other examples, the first cleaning elements 116 can vary in number, shape, size, or arrangement. As an example, one first cleaning element 116 or more than two first cleaning elements 116 may be employed, in which case one or more than two outer surfaces 186 may be utilized. Moreover, in other examples, the first cleaning elements 116 can be carried by the collar 108 via a single leg 184, more than two legs 184, or one or more differently sized or shaped.

As illustrated in FIGS. 1 and 3, the second cleaning element 120 in this example takes the form of a sleeve having a base portion 250 and a pair of legs 254 that extend outward (downward in FIGS. 1 and 3) from the base portion 250. The base portion 250 has a rectangular shape defined by a top surface 251 and a bottom surface 252 opposite the top surface 251. The bottom surface 252 includes, and is preferably coated with, a cleaning substance, e.g., emery, which facilitates cleaning of a sealing surface of the valve body. Thus, the bottom surface 252 may also be referred to herein as a cleaning surface of the second cleaning element 120. Like the cleaning surfaces 186, the cleaning surface 252 may be removed and replaced with different cleaning surfaces, respectively. The legs 254 each have an irregular shape that extends along a longitudinal axis 258 coaxial with the longitudinal axis 132, widens as the legs 254 extend away from the bottom surface 252 of the base portion 250, and then tapers before terminating at ends 262. In other examples, the base portion 250 may have a different shape (e.g., a cylindrical shape) and/or the legs 254 may have a different shape.

The second cleaning element 120 also includes a bore 266 and a pair of slots 270. The bore 266 extends through the sleeve 112 along a longitudinal axis 268. The bore 266 has a first portion 274 that is formed in the base portion 250 and is sized to receive a portion of the stem 104, and a second portion 278 that is formed between the pair of legs 204 and sized to receive another portion of the stem 104. As illustrated, the first portion 274 of the bore 266 has a diameter that is smaller than a diameter of the second portion 278 of the bore 266, though this need not be the case. The pair of slots 270 are formed in the base portion 250, and, more particularly, in the top surface 251 of the base portion 250. The pair of slots 270 are formed opposite one another, with one slot 270 offset from the longitudinal axis 268 in a first direction and the other slot 270 offset from the longitudinal axis 268 in a second direction opposite the first direction. As illustrated, each slot 270 in this example has a substantially rectangular shape in cross-section, though in other examples, the shape of the slots 270 can vary (e.g., can be cylindrical).

In other examples, the second cleaning element 120 may vary in size, shape, or arrangement. As an example, the base portion 250 may have a different shape or the second cleaning element 120 may include only one leg 254, more than two legs 254, or one or more different legs. As another example, the second cleaning element 120 may include multiple cleaning surfaces 252. As yet another example, the second cleaning element 120 may only include one slot 270 or may include more than two slots 270.

With reference now to FIGS. 1 and 4, the control mechanism 124 in this example includes a lever 300 and a handle 304 that is coupled to the lever 300. The lever arm 300 in this example is an L-shaped arm that extends along a transverse axis 308 from a first end 312 to a second end 316. A bore 320 and an opening 324 are formed in the lever 300 proximate to the second end 316 of the lever 300. The bore 320 extends along a longitudinal axis 328 that is perpendicular to the transverse axis 308, and is sized to receive a portion of the stem 104. The opening 324 also extends along the longitudinal axis 328, as the opening 324 extends, or is defined, between the bore 320 and a pair of projections 332 that extend outward (downward in FIG. 4) from the lever 300. As illustrated, the opening 324 has a larger diameter than the bore 320. The opening 324 is thus sized to receive a larger diameter portion of the stem 104 than the bore 320. The handle 304 in this example is a manually actuated handle that is coupled to the lever 300 proximate to the first end 312 of the lever 300, such that the handle 304 extends outward (upward in FIG. 4) from the lever 300 along a longitudinal axis 336 that is spaced from but parallel to the longitudinal axis 328. The handle 304 may be coupled to the lever 300 via a rod 340 extending through the handle 304 and disposed in an aperture (not shown) formed in the lever 300, as illustrated in FIG. 4, or in some other manner.

It will be appreciated that the control mechanism 124 can vary from what is illustrated. The lever 300 and/or the handle 304 can, for example, vary in shape, size, and/or configuration. In some examples, the manual control mechanism 124 illustrated in FIGS. 1 and 4 can be replaced with an automatic control mechanism. In one such example, a chuck feature can be fixed onto the first portion 144 of the stem 104 so as to facilitate attachment of a power tool or other automatic control mechanism to the stem 104. In some examples, the manual control mechanism 124 can be extendable or retractable in order to accommodate various designs, various environments, and various operators.

As illustrated in FIGS. 1 and 5, the locking element 128 in this example takes the form of a locking pin having a shaft 344. The shaft 344 has a rectangular or substantially rectangular shape that extends from a first end 348 to a second end 352 along an axis 356. The shaft 344 has an enlarged head 360 at the first end 348, as well as a pair of outwardly projecting fins 364 formed at or proximate the second end 352. The fins 364 are generally arranged to interferingly engage a portion of the lever 300 when the locking element 128 is disposed in one of the apertures 160, 162 in order to securely couple the locking element 128 to the stem 104 (and vice-versa). Optionally, the locking pin may also include a gripping element 368 (e.g., a ring) that is coupled to the enlarged head 360 so as to facilitate insertion of the locking pin into the desired aperture 160, 162 and removal of the locking pin from the aperture 160, 162.

Figure 7:
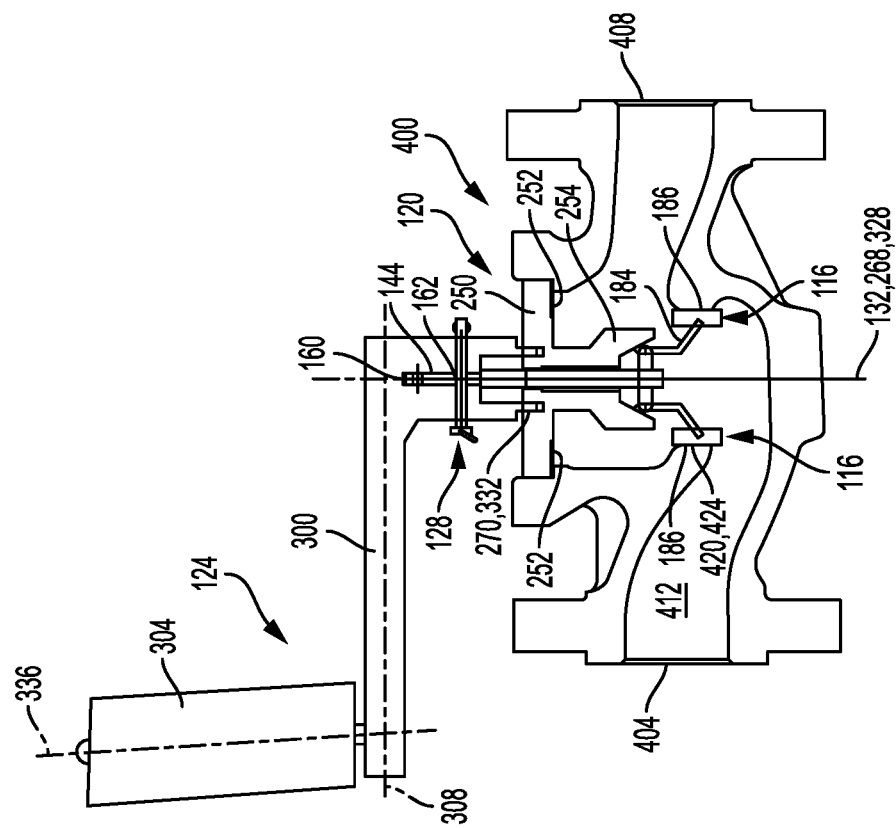
FIG. 7 is similar to FIG. 6, but shows the tool in a cleaning configuration in which the tool can be used to clean sealing surfaces of the valve body.
Figure 6:
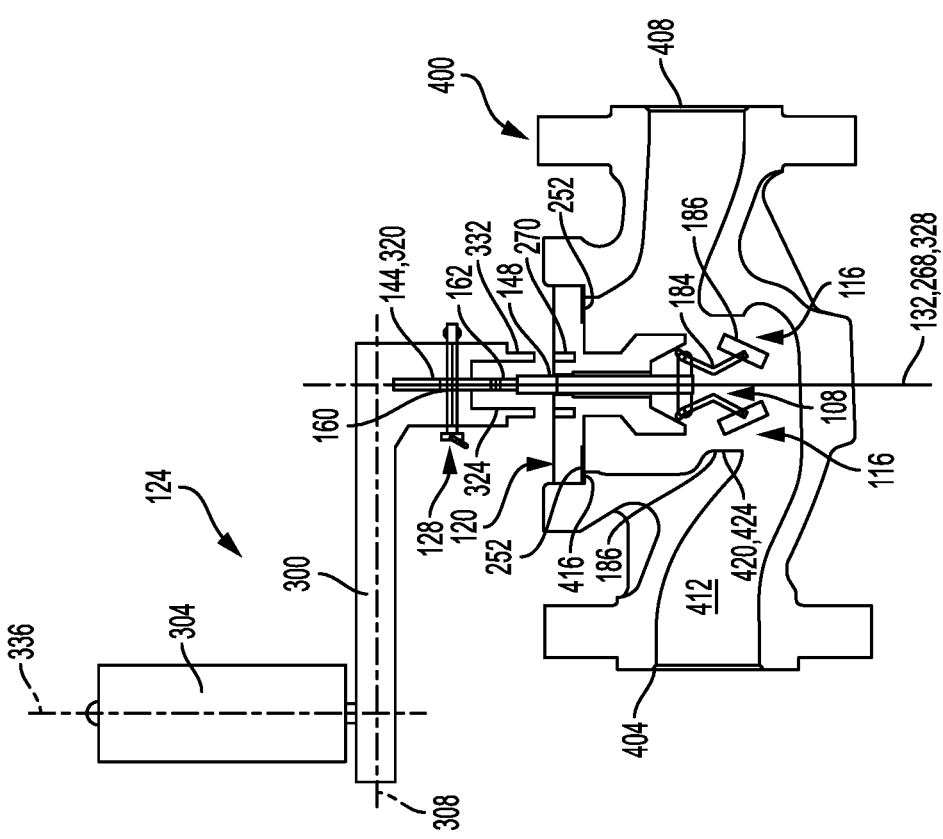
FIG. 6 is a cross-sectional view of the tool utilized in combination with an example of a valve body but in a pre-cleaning configuration.

While the various components of the tool 100 may be assembled as illustrated in FIG. 1, it will be appreciated that the components of the tool 100 are generally configured to be assembled in connection with a valve body of a control valve, e.g., the valve body 400 illustrated in FIGS. 6 and 7, after a valve trim assembly of the control valve has been removed for replacement or repair.

The valve body 400 generally includes an inlet 404, an outlet 408, and a fluid flow passageway 412 extending between the inlet 404 and the outlet 408. The valve body 400 also generally includes a first, annular sealing surface 416 and a second, annular sealing surface 420. While not illustrated herein, the first sealing surface 416 is generally arranged to receive an annular surface of a bonnet that is not shown but carries the valve trim assembly when the valve trim assembly is installed in the valve body 400. The second sealing surface 420 defines an annular valve port 424 through which fluid flowing through the fluid flow passageway 412 passes. While not illustrated herein, the annular valve port 424 is arranged to receive a valve seat of the valve trim assembly when the valve trim assembly is installed in the valve body 400.

After the valve trim assembly of the control valve has been removed from the valve body 400 for replacement or repair, the components of the tool 100 can be assembled together in a pre-cleaning or assembled configuration, as illustrated in FIG. 6. Once assembled, the tool 100 can be moved from the assembled configuration shown in FIG. 6 to the cleaning configuration shown in FIG. 7. When the tool 100 is in the cleaning configuration shown in FIG. 7, the tool 100 can be used to safely, efficiently, effectively, and consistently clean the first and second sealing surfaces 416, 420 of the valve body 400.

In this example, the components of the tool 100 are assembled in the order described below, though in other examples, the components may be assembled in a different manner. First, the second cleaning element 120 is loosely coupled to the stem 104, particularly the second portion 148 of the stem 104, such that the second cleaning element 120 is retained on the stem 104 and the axis 268 is co-axial with the axis 132, but the first cleaning elements 116 are in their retracted position. In this example, this is accomplished by loosely threading the inner surface of the second cleaning element 120 to the outer surface of the second portion 148 of the stem 104. Second, the loosely coupled together stem 104 and second cleaning element 120 are disposed in the valve body 400 so that the cleaning surface 252 of the second cleaning element 120 is seated against the first sealing surface 416 of the valve body 400, but the first cleaning elements 116 are spaced from the second sealing surface 420 of the valve body 400 (not shown). Third, the stem 104 (which is loosely coupled to the second cleaning element 120) is coupled to the control mechanism 124 such that the axis 132 is co-axial with the axis 328 and parallel to but spaced from the axis 336. In this example, this is accomplished by positioning the stem 104 or the control mechanism 124 so that the first portion 144 of the stem 104 is disposed in or received by the bore 320 of the lever 300, and disposing (e.g., inserting) the locking element 128 into the first aperture 160 of the stem 104, as illustrated in FIG.

6. In turn, the second portion 148 of the stem 104 is disposed in or received by the opening 324 of the lever 300, and the projections 332 are aligned with but spaced from the slots 270 formed in the second cleaning element 120, as is also illustrated in FIG. 6.

With the components of the tool 100 so assembled and the tool 100 coupled to the valve body 400, the tool 100 can be manipulated from the pre-cleaning configuration shown in FIG. 6 to the cleaning configuration shown in FIG. 7 to clean the first and second sealing surfaces 416, 420 of the valve body 400. It will be appreciated that in this example, the tool 100 is so manipulated by an operator of the tool 100. In other examples, however, one or more of the steps may be automatically performed (e.g., by an automatic control mechanism).

In any event, the tool 100 is initially moved in a manner that tightens the connection between the stem 104 and the second cleaning element 120 and drives the first cleaning elements 116 toward and into engagement with the second sealing surface 420 of the valve body 400. In this example, this is accomplished by actuating (e.g., rotating) the handle 304 in a counterclockwise direction, which in turn rotates the lever 300 and the stem 104 (coupled to the lever 300) in the counterclockwise direction, moving the stem 104 (upward) relative to the second cleaning element 120. As the stem 104 moves upward relative to the second cleaning element 120, the first ends 188 of the first legs 184 move upward, toward the base portion 250 of the second cleaning element 120, and along the tapered portions of the second legs 254, respectively. This movement drives the first cleaning elements 116 from the retracted position shown in FIG. 6 to the expanded position shown in FIG. 7. In other words, this movement drives the cleaning surfaces 186 of each cleaning element 116 toward and into engagement with the second sealing surface 420 of the valve body 400. The handle 304 is moved in the described manner until the cleaning elements 116 tightly engage the second sealing surface 420 of the valve body, such that there is sufficient pressure or force to effectively clean the second sealing surface 420. Next, the locking element 128 is removed from the first aperture 160 by, for example, pulling on the gripping element 368 of the locking element 128. With the locking element 128 removed from the stem 104, the handle 304 can be manipulated so that the projections 332 extending from the lever 300 are moved toward and into the slots 270 of the second cleaning element 120, as illustrated in FIG. 7. In this example, an operator of the tool 100 moves the projections 332 toward and into the slots 270 by lowering the handle 304. When the projections 332 are disposed in the slots 270, the locking element 128 is inserted into the second aperture 162 of the stem 104, thereby securing the control mechanism 124 in the position shown in FIG. 7. When the control mechanism 124 is secured in this position, the handle 304 can be rotated, by the operator, in a clockwise or a counterclockwise direction (whichever direction provides the best clean and/or is most convenient to the operator). And as the handle 304 rotates, the cleaning surfaces 186 of the first cleaning elements 116 scrub the second sealing surface 420 of the valve body 400 and the cleaning surface 252 of the second cleaning element 120 scrubs the first sealing surface 416 of the valve body 400, thereby cleaning the first and second sealing surfaces 416, 420.

When the sealing surfaces 416, 420 of the valve body 400 have been sufficiently cleaned, the tool 100 may be decoupled from the valve body 400 and disassembled in a similar, but opposite manner. More particularly, the locking element 128 is removed from the second aperture 162, which allows the lever 300 and the handle 304 to be manipulated (e.g., lifted) so that the projections 332 are removed from the slots 270 and moved away from the slots 270. The locking element 128 can, in turn, be inserted back into the first aperture 160, at which time the tool 100 can be moved in a manner that loosens the connection between the stem 104 and the second cleaning element 120 and drives the first cleaning elements 116 out of engagement with and away from the second sealing surface 420 of the valve body 400. In this example, this is accomplished by rotating the handle 304 in a clockwise direction, which in turn rotates the lever 300 and the stem 104 (coupled to the lever 300) in the clockwise direction, moving the stem 104 (downward) relative to the second cleaning element 120. As the stem 104 moves downward relative to the second cleaning element 120, the first ends 188 of the first legs 184 move downward, away from the base portion 250 of the second cleaning element 120. When the connection between the stem 104 and the second cleaning element 120 is sufficiently loosened (e.g., the first cleaning elements 116 are in their retracted position), the components of the tool 100 may be removed from the valve body 400. The process of removing the components of the tool 100 may be done in one step or in multiple steps (e.g., by first decoupling the control mechanism 124 from the stem 104 and then removing the stem 104 and the second cleaning element 120 from the valve body 400).

Finally, while the tool 100 is implemented in connection with the valve body 400 for the purpose of cleaning the sealing surfaces 416, 420 of the valve body 400, the tool 100 can be used to clean only one of the sealing surfaces 416, 420, other sealing surfaces of the valve body 400, other surfaces of the valve body 400 (e.g., a guide surface of the valve body 400 such as the guide surface that engages a perimeter of the second cleaning element 120), or one or more sealing surfaces of other valve bodies. When, for example, the tool 100 is implemented in connection with other valve bodies, the components of the tool 100 may vary in shape and/or size in order to accommodate those different valve bodies (and/or to accommodate different valve trim assemblies).

The invention claimed is:

1. A tool for cleaning a sealing surface of a valve body, the tool comprising:
   a sleeve;
   a stem adapted to be disposed in the valve body, the stem extending through the sleeve and along a longitudinal axis;
   at least one cleaning element coupled to the stem, the at least one cleaning element comprising at least one cleaning surface adapted to selectively engage the sealing surface when the stem is disposed in the valve body;
   a handle operatively coupled to the at least one cleaning element via the stem; and
   a lever connecting the handle and the stem,
   wherein the stem includes first and second apertures corresponding to first and second positions of the stem relative to the handle, respectively, and further comprising a locking element configured to be removably disposed in the first or second aperture to secure the stem in the first or second position, respectively, the locking element comprising a locking pin having a shaft that extends along an axis that is perpendicular to the longitudinal axis,
   wherein the sleeve is structurally separate from the stem, and wherein when the stem is secured in the second position, the at least one cleaning element is movable responsive to actuation of the handle such that the at least one cleaning surface cleans the sealing surface of the valve body.

2. The tool of claim 1, wherein the lever comprises an opening, and wherein the stem has an end removably disposed in the opening of the lever.

3. The tool of claim 1, further comprising at least one leg coupled to and extending outward from the stem, wherein the at least one cleaning element is coupled to the stem via the at least one leg.

4. The tool of claim 3, further comprising a collar coupled to the stem, the collar carrying the at least one leg.

5. The tool of claim 1, sleeve comprises at least one slot, and wherein the lever comprises at least one outwardly extending projection arranged to be removably disposed in the at least one slot.

6. A tool for cleaning first and second sealing surfaces of a valve body, the tool comprising:
- a stem adapted to be disposed in the valve body, the stem extending along a longitudinal axis;
- at least one first leg coupled to and extending outward from the stem;
- at least one first cleaning element coupled to a first portion of the stem via the at least one first leg, the at least one first cleaning element comprising at least one first cleaning surface adapted to selectively engage the first sealing surface when the stem is disposed in the valve body;
- at least one second cleaning element coupled to a second portion of the stem, the at least one second cleaning element comprising at least one second cleaning surface adapted to selectively engage the second sealing surface when the stem is disposed in the valve body;
- a handle operatively coupled to the at least one first cleaning element and the at least one second cleaning element via the stem, wherein the at least one first cleaning element and the at least one second cleaning element are movable responsive to actuation of the handle such that the at least one first and at least one second cleaning elements clean the first and second sealing surfaces of the valve body; and
- a sleeve coupled to the stem, wherein the stem is movable relative to the sleeve along the longitudinal axis to move the at least one first cleaning element between a retracted position, spaced from the first sealing surface, and an expanded position, in engagement with the first sealing surface, wherein the at least one first leg slidably engages a portion of the sleeve as the at least one first cleaning element moves between the retracted position and the expanded position.

7. The tool of claim 6, further comprising a lever coupled to the handle and to the stem, wherein the lever comprises an opening, and wherein the stem has an end removably disposed in the opening of the lever.

8. The tool of claim 6, wherein the stem includes first and second apertures corresponding to first and second positions of the stem relative to the handle, respectively, and further comprising a locking element configured to be removably disposed in the first or second aperture to secure the stem in the first or second position, respectively.

9. The tool of claim 6, further comprising a collar coupled to the stem, the collar carrying the at least one first leg, wherein the at least one first leg is rotatable relative to the collar to move the at least one first cleaning element between the retracted position and the expanded position.

10. The tool of claim 6, wherein the sleeve defines the at least one second cleaning element and the sleeve comprises a base portion and at least one second leg extending outward from the base portion, the base portion carrying the at least one second cleaning surface.

11. The tool of claim 10, further comprising a lever coupled to the handle and the stem, wherein the at least one second cleaning element comprises at least one slot formed in the base portion of the sleeve, and wherein the lever comprises at least one outwardly extending projection arranged to be removably disposed in the at least one slot.

12. The tool of claim 6, wherein the at least one second cleaning element extends along an axis perpendicular to the longitudinal axis.

* * * * *

UNITED STATES PATENT AND TRADEMARK OFFICE
CERTIFICATE OF CORRECTION

PATENT NO. : 10,926,299 B2
APPLICATION NO. : 15/721204
DATED : February 23, 2021
INVENTOR(S) : Steven K. Hostetter et al.

Page 1 of 1

It is certified that error appears in the above-identified patent and that said Letters Patent is hereby corrected as shown below:

In the Specification

At Column 3, Line 23, delete "In accordance with another preferred form,".

At Column 3, Line 36, "handle" should be -- handle." --.

At Column 6, Line 65, "pair of legs 204" should be -- pair of legs 254 --.

In the Claims

At Column 11, Line 16, "sleeve" should be -- wherein the sleeve --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*